(12) United States Patent
Molinari et al.

(10) Patent No.: US 6,308,065 B1
(45) Date of Patent: Oct. 23, 2001

(54) APPARATUS FOR TESTING CELLULAR BASE STATIONS

(75) Inventors: David H. Molinari, Newman Lake; Mark A. Stambaugh, Liberty Lake, both of WA (US); Peter J. Cain, Midlothian (GB)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/206,797

(22) Filed: Dec. 7, 1998

(51) Int. Cl.[7] ..................................................... H04Q 7/20
(52) U.S. Cl. ........................ 455/424; 455/423; 455/67.1
(58) Field of Search .................... 455/67.1, 67.4, 455/116, 117, 129, 102, 103, 8, 9, 56.1, 126, 226.1, 423, 562, 78, 424, 13–15, 67.6; 343/703, 860, 850, 852, 701; 324/637, 645, 646

(56) References Cited

U.S. PATENT DOCUMENTS

| | | | |
|---|---|---|---|
| 5,014,344 | * | 5/1991 | Goldberg ................................ 455/51 |
| 5,201,061 | * | 4/1993 | Goldberg et al. .................... 455/51.2 |
| 5,257,404 | * | 10/1993 | Goreham et al. .................... 455/51.2 |
| 5,471,649 | | 11/1995 | Rees et al. ........................... 455/67.4 |
| 5,490,204 | | 2/1996 | Gulledge ................................ 379/59 |
| 5,504,800 | | 4/1996 | Yehushua et al. ...................... 379/27 |
| 5,548,820 | * | 8/1996 | Victorin ............................... 455/67.4 |
| 5,570,373 | | 10/1996 | Wing ....................................... 375/5.1 |
| 5,678,208 | * | 10/1997 | Kowalewski et al. ................. 455/115 |
| 5,706,333 | | 1/1998 | Grenning et al. ....................... 379/59 |
| 5,737,316 | * | 4/1998 | Lee ........................................ 370/248 |
| 5,940,006 | * | 8/1999 | MacLellan et al. ............. 340/825.44 |
| 5,949,380 | * | 9/1999 | Swank, II ............................. 343/703 |
| 6,005,891 | * | 12/1999 | Chadwick et al. .................... 375/224 |
| 6,128,474 | * | 10/2000 | Kim et al. ............................ 455/67.1 |
| 6,131,020 | * | 10/2000 | Oja et al. ............................ 455/226.1 |
| 6,151,482 | * | 11/2000 | Eriksson ............................... 455/67.1 |

OTHER PUBLICATIONS

"Hewlett–Packard HP8920B RF Communications Test Set; HP8920B Option 800 for TDMA Test Configuration Guide", 1996 Hewlett–Packard Company, pp. 1–20.

"Hewlet–Packard HP E7460A CDMA Service Quality Analysis Systems Technical Specifications", 1998 Hewlett–Packard Company, pp. 1–8.

"Hewlett–Packard HP #7470A and E7472A CDMA Integrated Air Interface Measurement Systems Technical Specifications", 1998 Hewlett–Packard Company, pp. 1–10.

(List continued on next page.)

Primary Examiner—Daniel Hunter
Assistant Examiner—Pablo Tran (57) ABSTRACT

An apparatus for testing cellular base stations is provided. A base station tester is connected to a control link between the base station controller and the cellular base station to receive the fixed signal. The fixed link signal contains a voice channel and a control channel that may be selectively monitored by the base station tester. The base station tester is also connected to the radio frequency (RF) output of the cellular base station to receive the RF signal from the cellular base station. Both the RF signal and the fixed link signal are obtained in a non-invasive manner such that the cellular base station may remain in service during the testing process. By monitoring the fixed link directly, the base station tester may evaluate directly the reaction of the cellular base station with its RF signal to the commands received from the fixed link to perform parametric transmitter measurements. The base station tester may further compare the information received from the voice channel with the information contained in the RF signal to perform parametric receiver measurements.

15 Claims, 7 Drawing Sheets

OTHER PUBLICATIONS

"Hewlett–Packard HP E74XX Series CDMA Drive Test Solutions Configuration Guide", Hewlett–Packard 1998, pp. 1–20.

"Hewlett–Packard HP 8920B Option 800 AMPS/NAMPS/DAMPS/DCCH RF Communications Test Set Product Information" Hewlett–Packard Company Aug. 1998, pp. 1–3.

"Hewlett–Packard Drive Test Solutions: Integrated RF and Call Performance Measurements Product Information" Hewlett–Packard Company, Aug. 1998, pp. 1–4.

"Hewlet–Packard HP8935 Series Base Station Test Solutions Product Literature", Hewlett–Packard Company 1997, pp. 1–8.

* cited by examiner

TABLE OF TESTS BY CELLULAR STANDARD

| | AMPS | TDMA GSM | TDMA NADC | CDMA |
|---|---|---|---|---|
| TRANSMITTER POWER ACCURACY | ✓ | ✓ | ✓ | ✓ |
| TRANSMITTER FREQUENCY ACCURACY | ✓ | ✓ | ✓ | ✓ |
| SWITCHING TIME BETWEEN POWER LEVELS | ✓ | ✓ | ✓ | ✓ |
| SWITCHING TIME BETWEEN FREQUENCIES | | ✓ | | |
| POWER SPECTRAL DENSITY | | | | |
| SPURIOUS POWER OUTPUT | ✓ | ✓ | ✓ | ✓ |
| MODULATION ACCURACY | ✓ | ✓ | ✓ | ✓ |
| SYMBOLS TRANSMITTED | | ✓ | ✓ | ✓ |

APPARATUS FOR TESTING CELLULAR BASE STATIONS

BACKGROUND OF THE INVENTION

This invention relates to cellular telephone communications and in particular to an apparatus for testing cellular telephone communications equipment.

With the increasing popularity of wireless communication, the resulting infrastructure now includes a vast network of cellular base stations. Wireless communication typically involves the transmission of information between a mobile station such as a handset, and a cellular base station that is connected to a public switched telephone network (PSTN) such as a local or long distance carrier.

During the progress of a call between the mobile station and cellular base station, several types of communications occur. The cellular base station first uses control channels to set up the call to a mobile station, assigning a frequency or channel number, power level, and so on, to the mobile station. Once the communication link has been established, traffic channels are used to communicate voice and data signals between the mobile station and the cellular base station. The cellular base station is in turn connected to the PSTN through a base station controller and mobile switching center.

Each cellular base station consists of a transceiver that is controlled by the base station controller via a fixed link. The base station controller may control a number of other transceivers via separate fixed links. Depending on the cellular standard and protocol, including for example, advanced mobile phone service (AMPS) according to the Electronic Industries Association (EIA) and TDMA (time division multiple access) digital cellular which complies with the IS-54 standard, the radio frequency (RF) signals produced by the cellular base station in response to command received over the fixed link will differ.

A variety of methods have evolved for supporting, testing, and maintaining the increasingly vast network of cellular base stations. The HP 8921/8935 RF Communications Test Set manufactured by Hewlett-Packard Company provides a variety of parametric tests of mobile stations such as cellular telephone handsets as well as cellular base stations. Used in conjunction with various cellular adapters which adapt the HP 8921/8935 for the various cellular standards, the HP 8921/8935 allows for testing call processing, transmitter parameters such as frequency error and output power, and receiver parameters such as audio distortion and frequency response. In some cases, the HP 8921/8935 simulates a mobile station to generate test signals for the cellular base station. However, the HP 8921/8935 does not monitor the fixed link between the cellular base station and base station controller.

Another approach to testing cellular base stations is described in U.S. Pat. No. 5,570,373, "Method and Apparatus for Testing a Radio in a Base Station Without Using a Radio Test Unit", issued Oct. 29, 1996, to Thomas E. Wing. Wing teaches a method for testing the base station in which data about call processing activities are collected, processed and then compared to expected results to detect a failure condition. The method taught by Wing is non-invasive in that no special test signals are generated during the data collection process. However, no actual measurements of the RF signal generated by the cellular base station are made. Instead, a statistical analysis of the collected call processing data is performed to infer the behavior of the cellular base station and detect errors after the fact.

It is desirable to measure the RF behavior of the cellular base station at the antenna in real-time responsive to commands received on the fixed link. Such "live" measurements are often needed when the behavior of the cellular base station is being verified by a service technician. For example, a parametric transmitter measurement that evaluates how quickly the cellular base station can change output power levels responsive to a command from the base station controller must be performed in real-time.

Other approaches for testing cellular base stations include initiating tests in the base station controller which injects test signals into the fixed link to control the cellular base station. The behavior of the cellular base station may then be evaluated using remote monitoring equipment. In U.S. Pat. No. 5,134,643, "Method and System for Testing Mobile Communication Systems", issued Jul. 28, 1992, to Kiyoshi Iwata, a cellular automated test set provides for a line control unit which transmits a line test instruction to a pseudo mobile station and monitors the delivery of the test instruction signal back through the base station. The line control unit judges whether the line connection is normal or abnormal depending on whether or not the station identifying information is received. In U.S. Pat. No. 5,471,649, "Base Station Transceiver Diagnostic Equipment", issued Nov. 28, 1995, to Rees et al., a remote base station diagnostic subsystem operates as a mobile transceiver which is in RF communication with the cellular base station. The remote base station diagnostic subsystem is under the control of the base station controller via a local area network to carry out the tests by the base station controller.

In the test methods taught by Iwata and by Rees et al., the base station controller initiates and runs the tests of the cellular base station. Conducting these tests in an invasive manner requires that the cellular base station be taken out of service for the test and operated in a test mode. Both methods further require additional hardware within the base station controller for storing and executing the test routines and as well as a communication bus separate from the fixed link which allows for control of the test. Supporting an appropriate set of tests in the base station controller that are compatible both with the particular cellular base station and with the external test hardware is problematic. The base station controller might not be physically located at the same cell site as the cellular base station, further complicating testing efforts. Furthermore, neither method taught by Iwata or by Rees et al. teaches making parametric tests of the cellular base station as it responds to commands received from the fixed link. It would therefore be desirable to have a method for testing the cellular base station non-invasively in real-time and without requiring specialized tests to be supported in the base station controller.

SUMMARY OF THE INVENTION

In accordance with the present invention, an apparatus for testing cellular base stations is provided. A base station tester is connected to a fixed link between the base station controller and the cellular base station to receive a fixed link signal. The fixed link signal contains a voice channel and a control channel that may be selectively monitored by the base station tester. The base station tester is also connected to the radio frequency (RF) output of the cellular base station to receive the RF signal from the cellular base station.

Both the RF signal and the fixed link signal are obtained in a non-invasive manner such that the cellular base station may remain in service during the testing process. By monitoring the fixed link directly, the base station tester may evaluate the reaction of the cellular base station with the RF signal to the commands received from the control channel in order to conduct parametric transmitter measurements. The base station tester may further contain an RF signal source for generating an RF test signal for the cellular base station in order to conduct parametric receiver measurements such as bit error rate (BER) and receiver sensitivity.

One feature of the present invention is to provide a method and apparatus for testing cellular base stations.

A further feature of the present invention is to provide a method of testing cellular base stations by performing parametric tests on cellular base stations using the fixed link signal and the RF signal.

Another feature of the present invention is to provide a method for testing cellular base stations by receiving selected information from the fixed link and from the RF signal to perform parametric measurements of the cellular base station.

Another feature of the present invention is to provide a method of testing cellular base stations by performing parametric tests on a cellular base station without taking the cellular base station out of service.

Other features, attainments, and advantages will become apparent to those skilled in the art upon a reading of the following description when taken in conjunction with the accompanying drawings.

DESCRIPTION OF THE INVENTION

Figure 1:
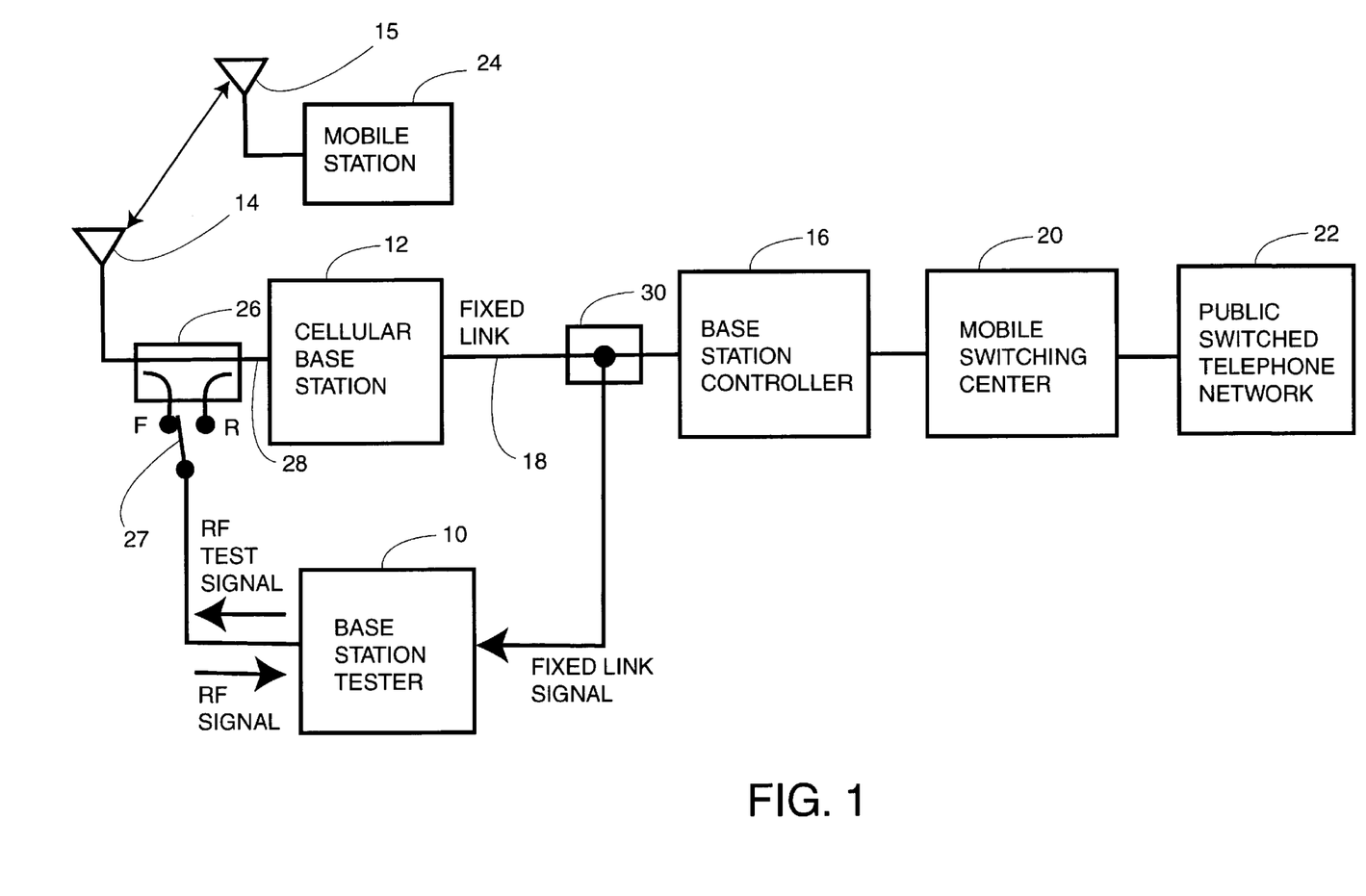
FIG. 1 is a block diagram of a base station tester as applied in testing a cellular base station according to the present invention.

In FIG. 1, there is shown a base station tester 10 according to the present invention applied in testing a cellular base station 12. The cellular base station 12, while installed in a cell site (not shown) during normal operation, is connected via a coaxial cable 28 to an antenna 14 for communication with a mobile station 24 having an antenna 15. A base station controller 16 communicates with the cellular base station 12 via a fixed link 18. The fixed link 18 typically consists of one or more bi-directional, high speed data lines that include a control channel and a voice channel (not shown) which may be implemented in a variety of ways according to data signaling protocols which may be industry-standard or proprietary, depending on the cellular protocol and the manufacturer of the cellular base station and base station controller. In a GSM cellular network, for example, the control channel and the voice channel may be implemented according to an industry-standard Abis-interface. Other cellular system standards such as AMPS have their own protocols on the fixed link 18.

The base station controller 16 is connected to a mobile switching center (MSC) 20 controls such activities as handing off calls between different cellular base stations 12 as the mobile station 24 changes locations. The MSC 20 may control a number of base station controllers 16 and cellular base stations 12 within the cellular network. The MSC 20 is in turn connected to the public switched telephone network (PSTN) 22 so that telephone calls may be routed between the cellular network and the telephone system.

The cellular base station 12 may be tested under a variety of circumstances at the cell site including acceptance testing during a new installation, out-of-service maintenance, and in-service maintenance. During acceptance testing and in-service maintenance at the cell site, it is particularly desirable that the cellular base station 12 be installed in its operating environment, fully operational and connected to the antenna 14 and base station controller 16. It is further desirable that both the fixed link signal at the fixed link 18 and the RF signal at the antenna 14 be monitored and used to obtain more detailed parametric tests of the cellular base station 12 in a non-invasive manner as explained in more detail below.

By selectively decoding and monitoring the control channel and the voice channel present in the fixed link signal from the fixed link 18, the base station tester 10 may observe traffic conditions, the loading of the cellular base station 12, call hand-offs, and the type of traffic present on the fixed link 18. The base station tester 10 is coupled to the fixed link 18 at a connector 30 to receive the fixed link signal in a non-invasive manner to avoid disruption to the communication between the base station controller 16 and cellular base station 12. The fixed link signal is bi-directional, meaning that the voice and control channels can be generated from either the cellular base station 12 or the base station controller 16. Because cellular communication is normally full duplex, voice and control channels in both directions between the cellular base station 12 and BSC 16 may be active at the same time.

In addition to the fixed link 18, the base station tester 10 is also connected to the coaxial cable 28 between the antenna 14 and cellular base station 12 via a directional coupler 26 and switch 27 to obtain an RF signal for measurements. The directional coupler 26 may be inserted in the coaxial cable 28 to selectively obtain the RF signal generated by the cellular base station 12 in the forward direction (F) or received from the mobile station 24 in the reverse direction (R). The switch 27 is connected to the directional coupler 26 to select between the F and R directions. Other methods for coupling the base station tester 10 to the cellular base station 12 to obtain the RF signal in a non-invasive manner such as using separate antenna for the base station tester 10 may be readily substituted for the directional coupler 26 as long as variabilities in the signal path between the base station tester 10 and cellular base station 12 are controlled for in order to avoid adverse effects to the measurements.

As part of the parametric transmitter measurement, the RF signal is used to observe the behavior of the cellular base station 12 as it reacts to commands received on the fixed link 18 such as to change frequencies or power levels. Such "live" RF measurements allow for testing the cellular base station 12 in real-time and with no need to maintain a special test mode in the base station controller 16 or to inject test signals into the fixed link 18. Similarly, the RF signal contains modulation information that may be demodulated and compared with the information received on the voice channel in the base station tester 10 to evaluate the transmitter portion (not shown) of the cellular base station 12 such as according to a BER test.

The RF signal from the mobile station 24 may also be used to generate parametric tests of the receiver portion (not shown) of the cellular base station 12. By monitoring the fixed link 18, the base station tester 10 can monitor the appropriate frequency or channel number of the mobile station 24 and compare the parametric tests of the RF signal with the information returned from the cellular base station 12 on the fixed link 18.

The base station tester 10 may also be used to simulate the mobile station 24 by injecting an RF test signal back into the cellular base station 12. The RF test signal could be modulated with test data in a controlled manner such that the test data sent over the RF test signal may be compared with the test data received on the control signal in order to perform a bit error rate (BER) test of the cellular base station 12 as explained in more detail below.

Figure 2:
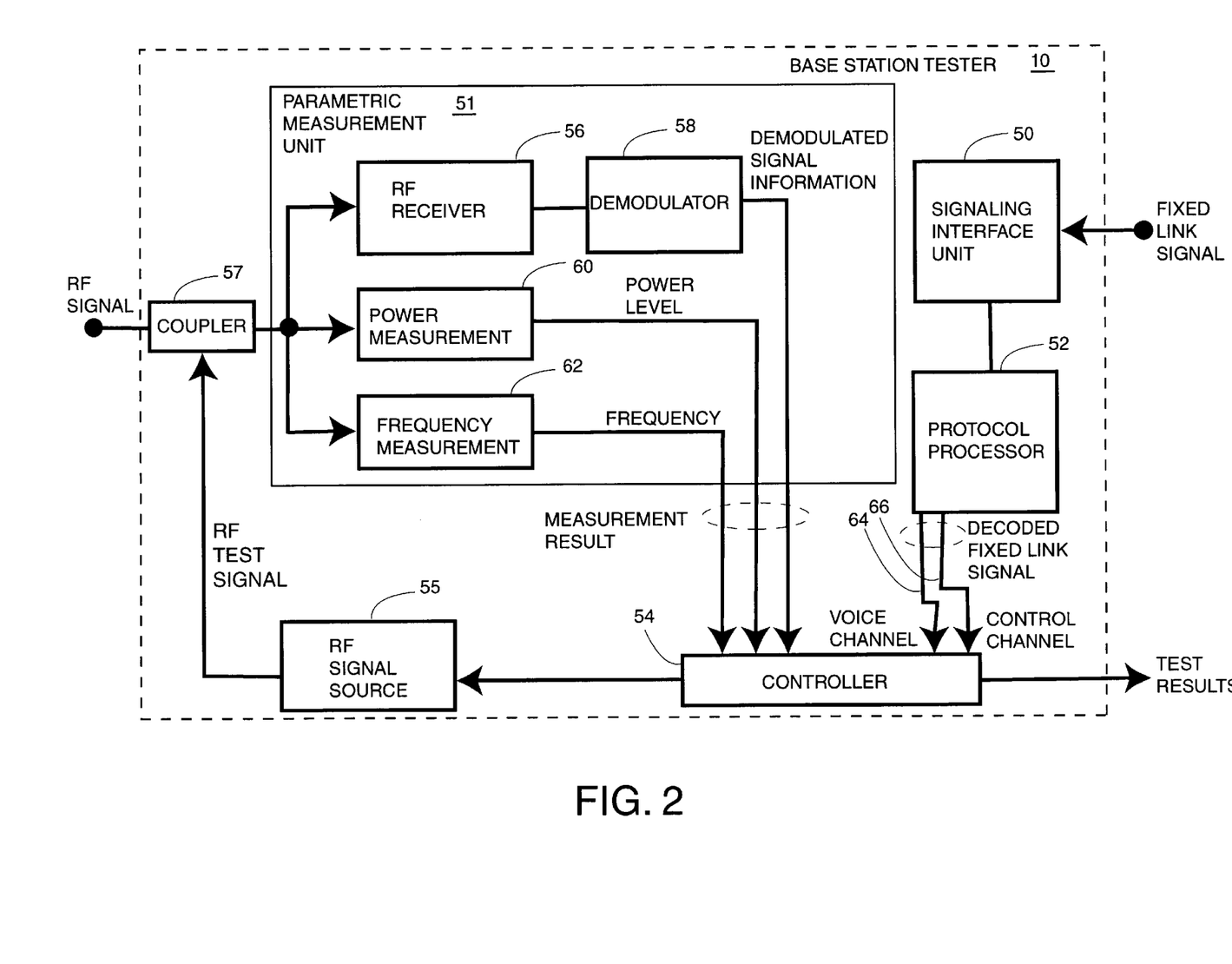
FIG. 2 is a block diagram of the base station tester.

FIG. 2 is a simplified block diagram of the base station tester 10 according to the present invention. The fixed link signal received from the fixed link 18 via the connector 30 is provided to a signaling interface unit 50. The signaling interface unit 50 operates as a network level device to buffer the data streams present in the fixed link signal according to the selected signaling standard. Data rates and signal levels may vary according to different signaling standards and the signaling interface unit 50 may be readily adapted to accommodate the various standards. A protocol processor 52 receives the fixed link signal from the signaling interface unit 50 and operates to decode the fixed link signal to provide a decoded fixed link signal which includes a voice channel 64 and a control channel 66. The control channel 66 is also known as a signaling channel in the industry. An example of the protocols that the protocol processor 52 may support includes the Abis-interface for GSM cellular.

A controller 54 receives the voice channel 64 and control channel 66 selectively decoded by the protocol processor 52. The controller 54 operates to execute various tests on the base station 12 and may be implemented as an embedded controller, microprocessor, or external computer. The controller 54 selects among the control channel 66 and voice channel 64 to obtain selected information to conduct a parametric transmitter or receiver measurement.

A parametric measurement unit 51 receives the RF signal from the directional coupler 26 and switch 27 via a coupler 57. The parametric measurement unit 51 may contain a variety of measurement units that provide the selected parametric tests. An RF signal source 55 may be employed to generate the RF signal source in order to simulate the mobile station 24 or generate other test signals.

The coupler 57 provides for using one connector for both the parametric measurement unit 51 and the RF signal source 55 and provides for signal routing such that the RF test signal is not coupled into the parametric measurement unit 51. The coupler 57, for example, may be constructed a directional coupler, a narrow band filter, or a diplexer. Alternatively, the RF signal source 55 could have its own connector for coupling the RF signal to the cellular base station 12. The configuration of the parametric measurement unit 51 is shown here for purposes of example and not limitation.

The configuration of the parametric measurement unit 51 may readily varied to meet the particular system requirements of the base station tester 10. The parametric measurement unit 51 may be controlled by the controller 54 to selectively provide a measurement results based on the demodulated signal information, power level, or frequency, for example, which are obtained in conjunction with information received from the voice channel 64 and control channel 66.

In the configuration of the parametric measurement unit 51 shown, the RF signal received from the directional coupler 26 and switch 27 is provided to an RF receiver 56. The RF receiver 56 selectively receives signals at frequencies controlled by the processor 54 from the antenna 14 and cellular base station 12 according to the R and F directions selected by the switch 27. The baseband signal produced by the RF receiver 56 is provided to a demodulator 58 that operates to demodulate the information contained in the RF signal to produce demodulated signal information. The demodulator 58 may be an analog frequency modulation (FM) demodulator to match an analog cellular system such as AMPS which is a narrow band FM system. Alternatively, the demodulator 58 may be purely digital to decode a digital cellular standard such as GSM, North American Digital Cellular (NADC), or PCS 1800. The demodulator 58 selectively provides the demodulated signal information decoded from the RF signal to the processor 54 for comparison with information received on the control channel 66.

In GSM cellular systems, the traffic channels in the RF signal are generally encrypted and not possible to decode the traffic channel independently from the mobile station 24. The base station tester 10 in this case could therefore be configured to function as the mobile station 24 such as by employing the internal functionality of the mobile station 24 within the RF signal source 55 in order to decrypt the traffic information in the RF signal or connect to a test station as explained in an alternative embodiment given below.

The RF signal is also provided to a power measurement 60 that measures the relative signal power of the RF signal. The methods for determining the RF signal power varies greatly by cellular standard. For example, in an AMPS cellular system, RF signal power may be obtained with a straightforward measurement of carrier power. In the case of code division multiplex access (CDMA) according to the EIA IS-95 standard, the determination of the RF signal power requires measuring relative power for a selected channel determined according to a particular Walsh spreading code. The same RF signal according to CDMA IS-95 may contain up to 64 channels but at different power levels.

The RF signal is also provided to a frequency measurement 62 that provides a measurement of the frequency of the RF signal. Similar to the method of the power measurement 60, the method for measuring of RF signal frequency depends on the type of RF signal modulated according to a cellular standard. In the AMPS cellular system example, measuring the frequency of the RF signal is a straightforward measurement of the RF carrier frequency. However, digital cellular standards such as GSM and CDMA requirement more sophisticated measurement techniques that are often defined according to industry standards.

The RF receiver 56, demodulator 58, power measurement 60, and frequency measurement 62 collectively provide parametric measurements of the RF signal as the parametric measurement unit 51. The demodulated signal information, power level, and frequency form the measurement result produced by the parametric measurement unit 51. To provide optimum versatility of the base station tester 10, the parametric measurement unit 51 should be capable of being adapted for different frequency bands which presently include 800 MegaHertz (MHz), 1800 MHz, and 1900 MHz, and a variety of analog and digital modulation types. The configuration and selection of the component measurement functions needed to perform parametric measurements of the RF signal may readily be varied to fit the needs of the application.

The present invention provides for the combination of the parametric measurements of the RF signal with the information received on the voice channel 64 or control channel 66 to evaluate the behavior of the transmission behavior of the cellular base station 10. When the cellular base station 12 is commanded to change frequency, the base station tester 10 receives and decodes the command alongside the cellular base station 12 and then performs parametric measurements of the RF signal from the cellular base station 12 knowing what the expected behavior of the cellular base station 12 is, such as frequencies and power levels.

The present invention further provides for the evaluation of the receiver portion (not shown) of the cellular base station 10. The RF signal source 55 receives test data from the controller 54 which is provided to the cellular base station 12 in a manner that simulates the mobile station 24. The test data received back from the cellular base station 24 via the fixed link signal may then be compared with the test data that was sent out via the RF signal source 55 to calculate the receiver bit error rate (BER). The receiver parametric test is described in more detail below.

By combining the RF parametric measurements with the information received on a fixed link 18, the base station tester 10 may carry out tests of the cellular base station 12 to produce test results without having to inject test signals in the fixed link 18 or provide for specialized testing hardware within the base station controller 16. More sophisticated parametric measurements such as measuring the switching time between power levels may now be performed because the time between the reception of the command and its execution can be measured. A more detailed example of such a parametric measurement is provided below.

Figure 3:
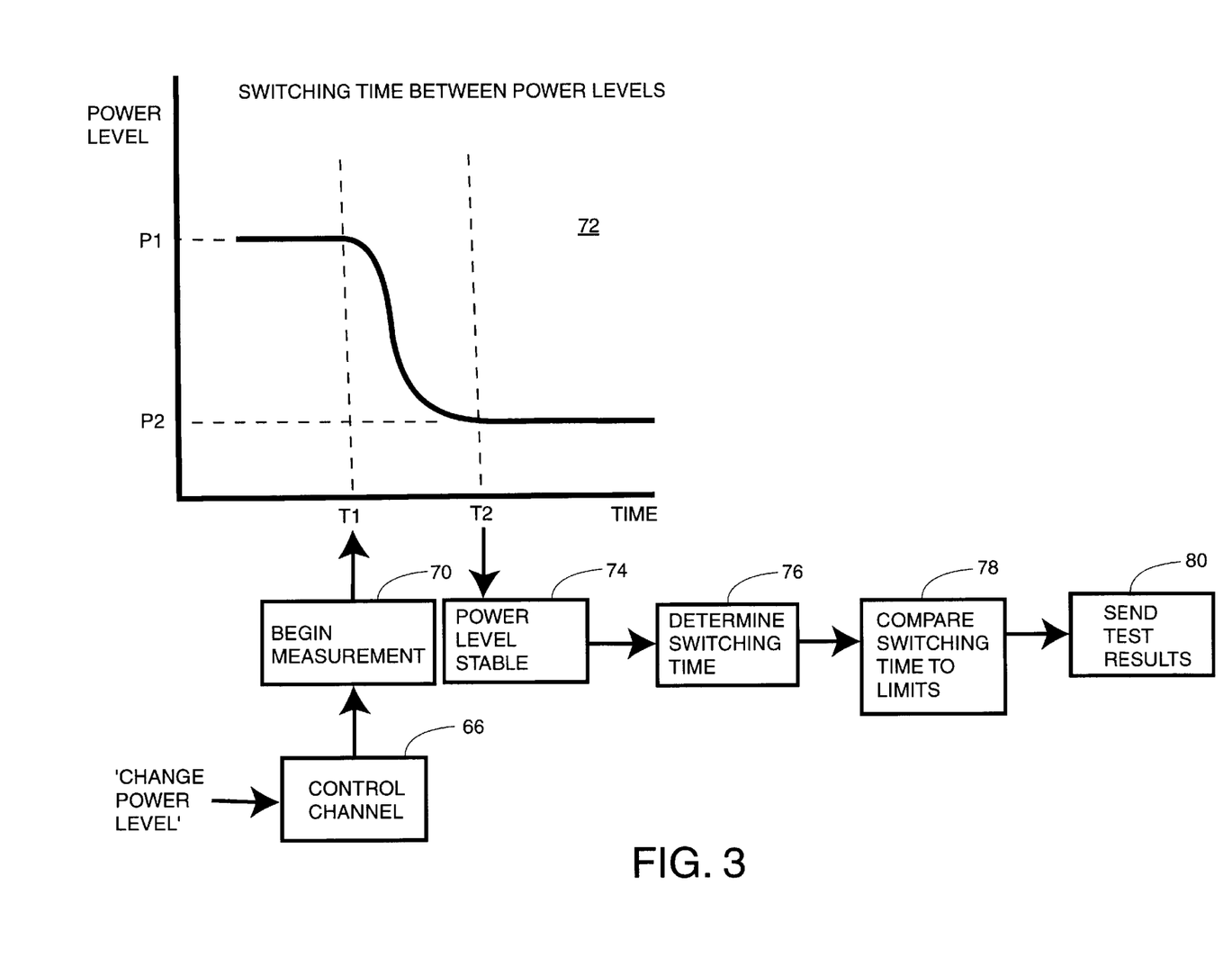
FIG. 3 is a process flow diagram showing the performance of a measurement for switching time between power levels performed by the base station tester.
Figure 4:
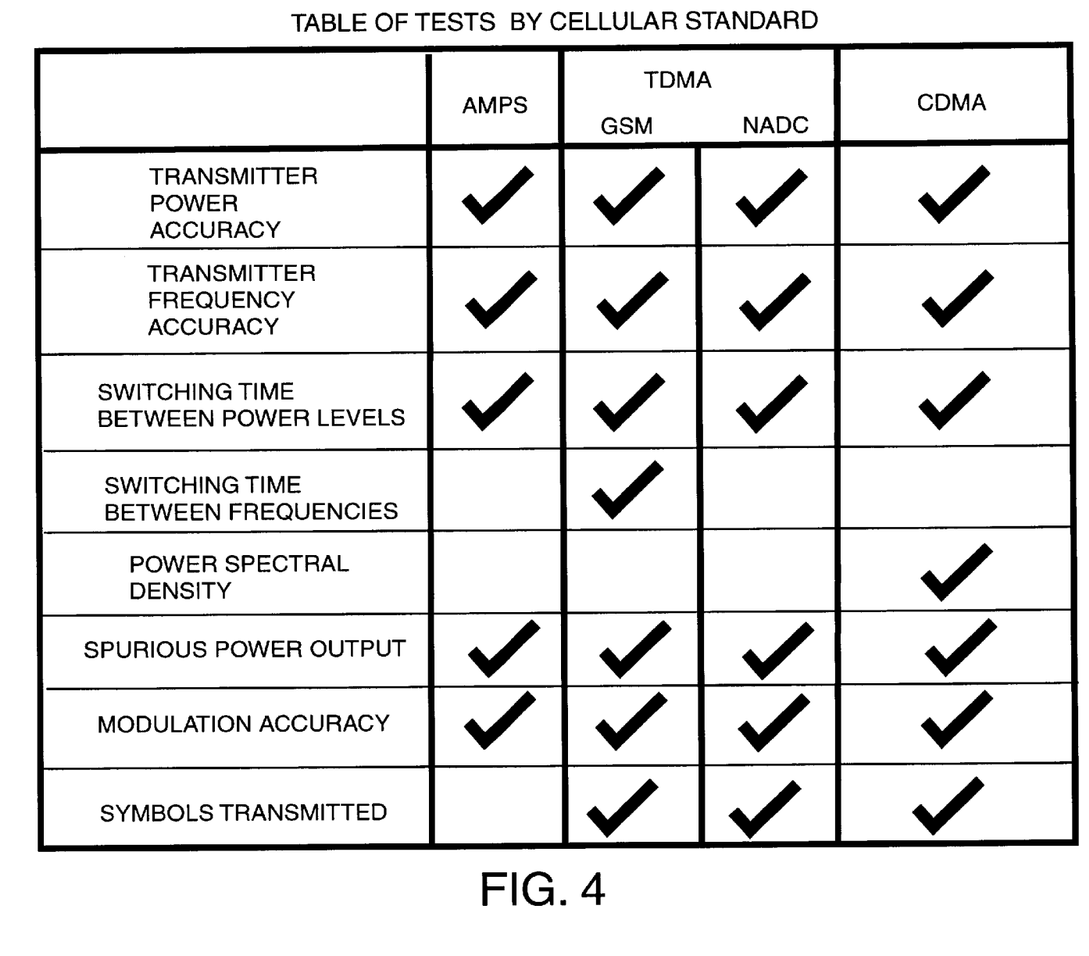
FIG. 4 is a chart of measurements by cellular system type typically performed by the base station tester.
Figure 5:
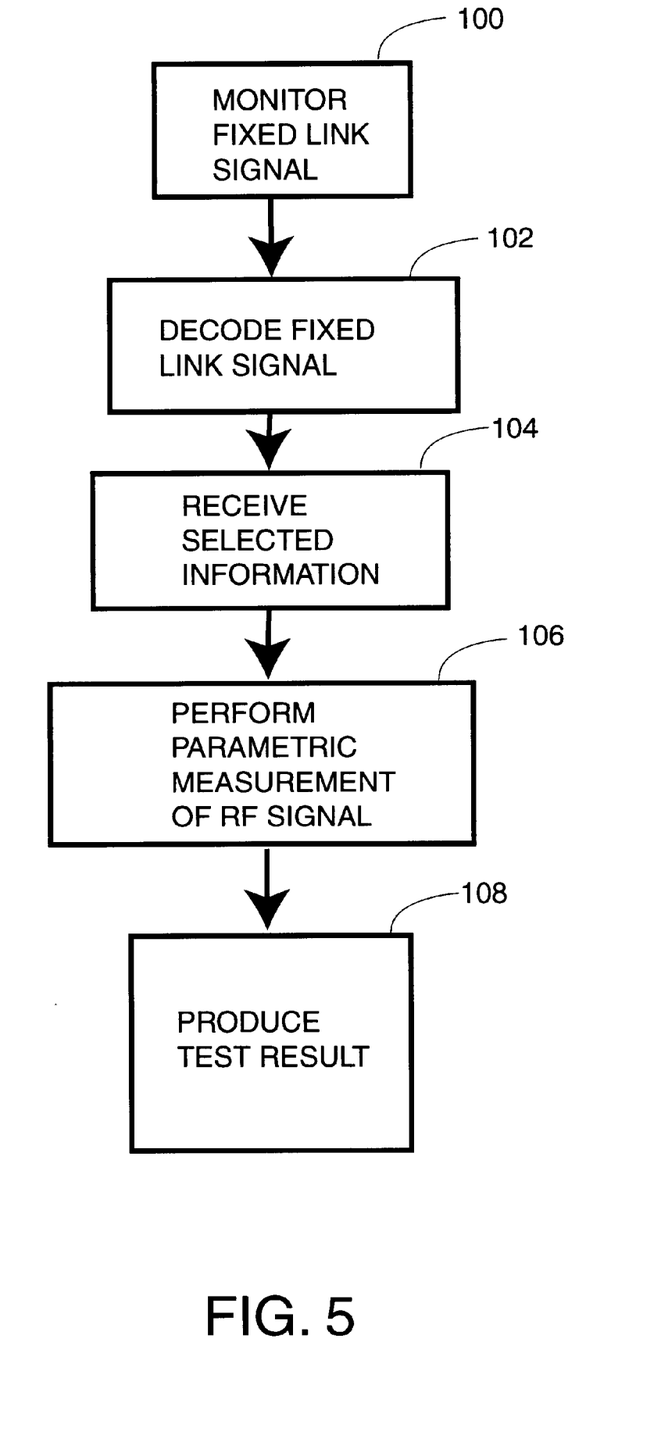
FIG. 5 is a flow chart of the process of making a parametric transmitter measurement according to the present invention.
Figure 6:
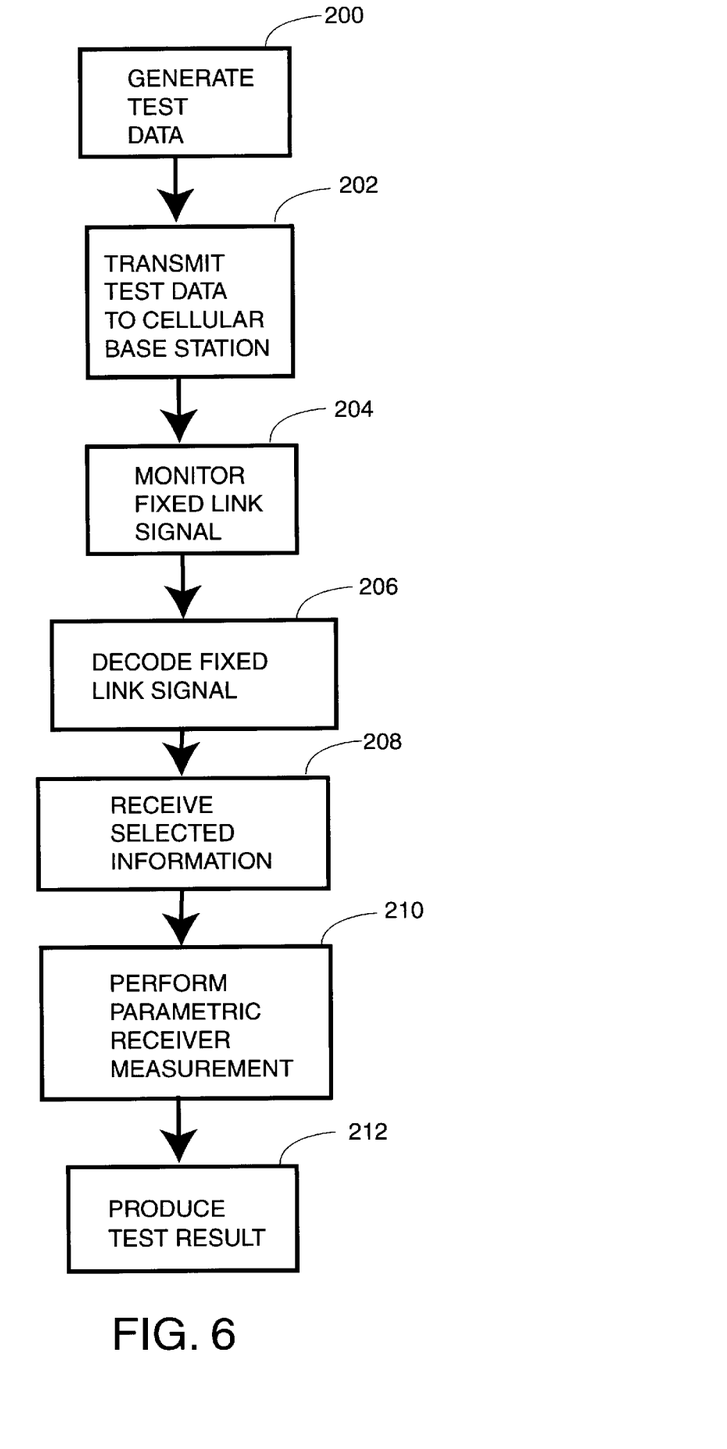
FIG. 6 is a flow chart of the process of making a parametric receiver measurement according to the present invention.
Figure 7:
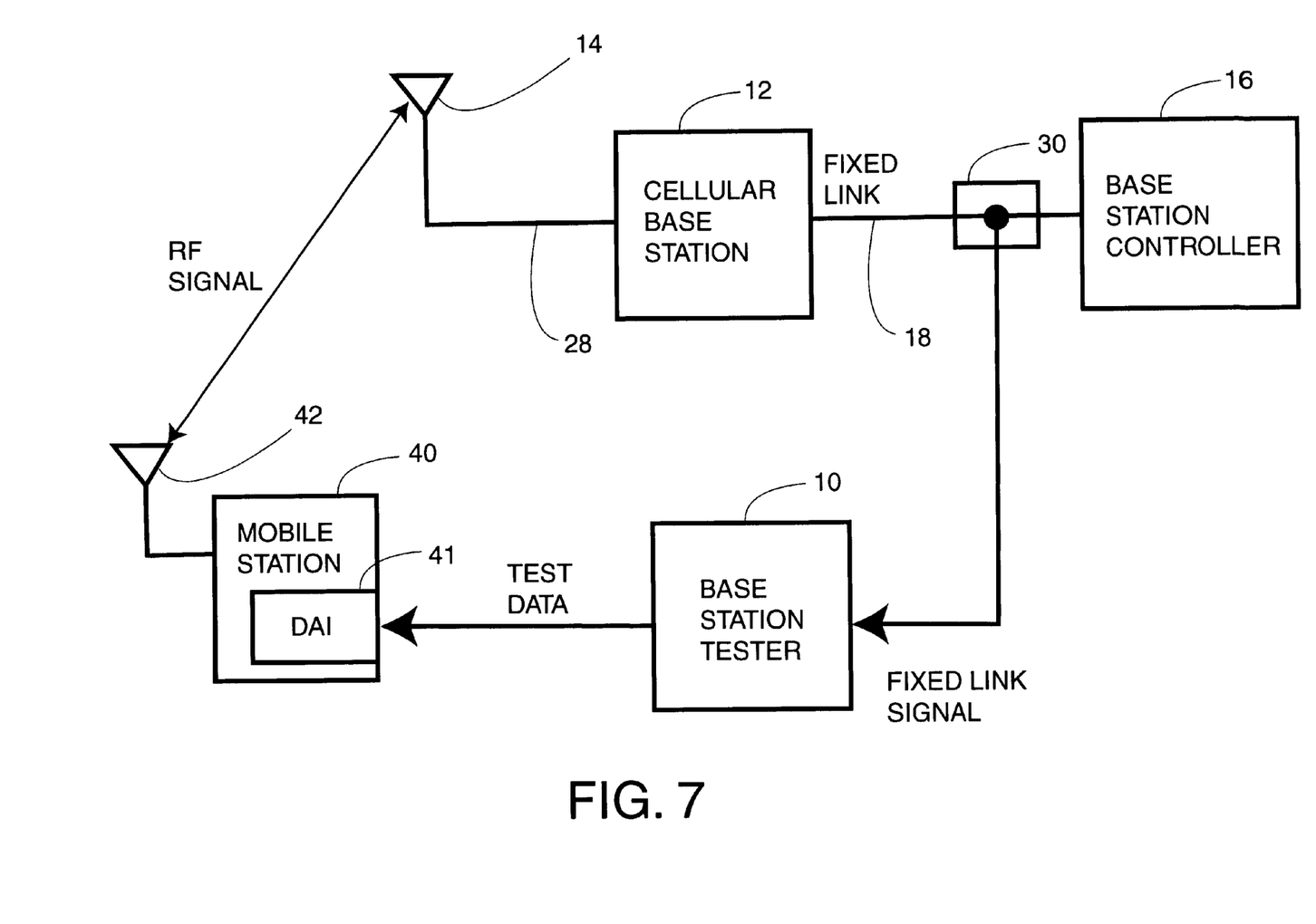
FIG. 7 is a block diagram of an alternative embodiment of the base station tester using a mobile station with a DAI interface to generate an RF test signal according to the present invention.

By evaluating the reaction of the cellular base station 12 to the fixed link signal using the RF signal, transmitter parametric tests can thus be performed. FIGS. 3, 4, and 5 illustrate how transmitter parametric tests can be performed according to the present invention. Similarly, by evaluating the reaction of the cellular base station 12 to the RF signal, generated either by the mobile station 24 or other signal source at the fixed link signal, receiver parametric tests can be performed. FIGS. 6 and 7 illustrate how receiver parametric tests can be performed according to the present invention.

FIG. 3 is a flow diagram illustrating an example of a parametric transmitter measurement of switching time between power levels performed by the base station tester 10 according to the present invention. A command from the BSC 16 is sent to the cellular base station 12 during the progress of a call to a "change power level" which is also received by the base station tester 10 that is monitoring the control channel 66. The "change power level" command from the BSC 16 is decoded in the protocol processor 52 and provided via the control channel 66 to the processor 54 which begins the measurement to determine the switching time between power levels at time t1 in the process 70 labeled BEGIN MEASUREMENT.

In a power versus time plot 72, the process of measuring the power level of the RF signal is performed by the power measurement 60 which produces a power level measurement result. As shown, the RF signal initially has a power level P1 at time t1 when the "change power level" command is received. The cellular base station 12 also decodes the "change power level" command starting at time t1 and begins adjusting the power level to the new power level P2. At time t2, the new power level is determined to be stable at power level P2 by the processor 54 in the process 74 labeled POWER LEVEL STABLE.

In process 76 labeled DETERMINE SWITCHING TIME, the switching time between power levels, defined as the difference between times t2 and t1, is calculated. In process 78 labeled COMPARE SWITCHING TIME TO LIMITS, the switching time is compared against specification limits to determine a test result such as "pass" or "fail." In process 80 labeled SEND TEST RESULTS, the controller 54 sends the test results to other processes within the base station tester 10 such as to store the test result, display the test result to the user as a number or a graphical plot, or compare the test result against specifications to reach a pass/fail decision or against historical data to determine a trend.

FIG. 4 is a chart illustrating the various types of parametric transmitter measurements that may be performed according to the various cellular system standards by the base station tester 10. The chart is only a small subset, both of the number of parametric transmitter measurements available and the number of cellular system standards existing, and is shown for purposes of example and not limitation. The parametric transmitter measurements selected and cellular standards supported in the base station tester 10 may be readily modified for existing applications and to accommodate new applications and new cellular standards as they evolve.

Transmitter power accuracy is a parametric transmitter measurement that may be performed for any of the cellular standards listed although the actual measurement may be performed in entirely different ways between the cellular standards. The power measurement 60 may be employed to perform the power accuracy measurement to ensure compliance of the cellular base station 12 to specification. The transmitter power accuracy measurement is a parametric test that may be done by comparing the power level commanded by the BSC 16 with the power level measured by the power measurement 60.

Transmitter frequency accuracy is a parametric transmitter measurement that may also be performed for any of the cellular standards listed but with differences in the actual measurement for each of the cellular standards. The transmitter frequency accuracy measurement may be done by comparing the frequency commanded by the BSC 16 with the frequency measured by the frequency measurement 62.

Switching time between power levels is a parametric transmitter measurement that is performed as explained in FIG. 3 and, with the appropriate power measurement obtained from the power measurement 60, may be performed for any of the cellular standards listed. Switching time between frequencies is a parametric transmitter measurement that has meaning primarily for GSM cellular base stations since cellular base stations according to other cellular standards generally do not change frequencies very often.

Power spectral density and spurious power output are measurements of the spectral quality of the RF signal. Such measurements may be performed in the manner of a traditional spectrum analyzer using the RF receiver 56 which is selectively tuned to a range of frequencies around the RF signal from the cellular base station 12 to determine if undesirable levels of signals are being emitted. The behavior of the RF signal in its RF spectrum has meaning for any of the cellular standards listed and the parametric measurements are compared against specifications.

Modulation accuracy and symbols transmitted are measures of the modulation quality of the RF signal. In an analog AMPS cellular system, modulation accuracy may include the distortion and frequency deviation of the FM signal. In a digital cellular system such as NADC, the phase and amplitude accuracy of the quadrature phase shift key (QPSK) signal measured and compared against specifications. The RF receiver 56 in combination with the demodulator 58 may be used to measure modulation accuracy. In addition, data symbols from the voice channel 64 received from the fixed link 18 may be compared against data symbols decoded by the demodulator 58 which are transmitted by the cellular base station for any of the digital cellular systems to evaluate the bit error rate (BER) or other parametric measurement of transmission quality.

FIG. 5 is a flow diagram of the general process of providing a parametric transmitter measurement of the cellular base station 12 by the base station tester 10 according to the present invention.

In step 100 labeled MONITOR FIXED LINK SIGNAL, the base station tester 10 monitors the fixed link signal received from the fixed link 18. Obtained via the connector 30 and signaling interface unit 50, the fixed link signal from the fixed link 18 is monitored in a non-invasive manner to avoid disruption in communications during testing.

In step 102 labeled DECODE FIXED LINK SIGNAL, the fixed link signal from the signaling interface unit 50 is sent to the protocol processor 52 which produces the decoded fixed link signal containing the voice channel 64 and the control channel 66.

In step 104 labeled RECEIVE SELECTED INFORMATION, selected information from the voice channel 64 and the control channel 66 may be received by the controller 54. Such information could include commands on the control channel 66 such as the 'change power level' given in the example above which can be used to initiate parametric measurements.

In step 106 labeled PERFORM PARAMETRIC MEASUREMENT OF RF SIGNAL, the parametric measurement of the RF signal using the measurement result from the parametric measurement unit 51 is conducted in conjunction with the selected information received from the decoded fixed link signal. For example, the parametric measurement of the switching time between power levels explained above would begin upon receiving the 'change power level' command on the control channel 66.

In step 108 labeled PRODUCE TEST RESULT, the test result of the parametric measurement of step 106 is calculated. Such a test result could be a simple calculation such as the time to change power levels as illustrated in the FIG. 3 or a more complex evaluation of bit error rate (BER) of the transmitter portion of the cellular base station 12 which requires substantial amounts of information to be supplied to the controller 54. The test result may then be sent to other processes or devices within the base station tester 10 such as a display or memory (not shown).

FIG. 6 is a flow diagram of the general process of providing a parametric receiver measurement of the cellular base station 12 by the base station tester 10 according to the present invention.

In step 200 labeled GENERATE TEST DATA, test data generated by the controller 54 is sent to the RF signal source 55 to modulate the RF signal which emulates the mobile station 24.

In step 202 labeled TRANSMIT TEST DATA TO CELLULAR BASE STATION, the RF signal now modulated with the test data is transmitted to the cellular base station 12. The appropriate call set up and data protocols have been set up for normal operation of the cellular base station 12, preferably in its normal operating mode as it is installed at the cell site.

In step 204 labeled MONITOR FIXED LINK SIGNAL, the base station tester 10 monitors the fixed link signal received from the fixed link 18. Obtained via the connector 30 and signaling interface unit 50, the fixed link signal from the fixed link 18 is monitored in a non-invasive manner to avoid disruption in communications during testing.

In step 206 labeled DECODE FIXED LINK SIGNAL, the fixed link signal from the signaling interface unit 50 is sent to the protocol processor 52 which produces the decoded fixed link signal containing the voice channel 64 and the control channel 66.

In step 208 labeled RECEIVE SELECTED INFORMATION, selected information from the voice channel 64 and the control channel 66 may be received by the controller 54. Such information could include voice channel information such as a data stream from the base station controller 16 which can be compared with demodulated information from the RF signal received from the parametric measurement unit 51.

In step 210 labeled PERFORM PARAMETRIC RECEIVER MEASUREMENT, the parametric receiver measurement of the cellular base station 12 is conducted by evaluating the information generated by the cellular base station 12 in response to the RF signal. The selected information from the fixed link signal is collected in response to the RF signal.

In step 212 labeled PRODUCE TEST RESULT, the test result of the parametric measurement of step 210 is calculated. Such a test result could be a simple calculation such as a received signal strength or a more complex evaluation of bit error rate (BER) of the receiver portion of the cellular base station 12 which requires substantial amounts of information to be supplied to the controller 54. The test result may then be sent to other processes or devices within the base station tester 10 such as a display or memory (not shown). For example, a BER measurement is performed by comparing the test data received from the voice channel 64 with the test data that was sent by the RF signal source 55. The BER may be calculated according to known techniques.

In FIG. 7, there is shown an alternative embodiment of the base station tester 10 according to the present invention applied in performing a parametric receiver measurement on a cellular base station 12. The cellular base station 12 while installed in a cell site during normal operation is connected via the coaxial cable 28 to the antenna 14 as illustrated in FIG. 1. A mobile station 40, substituted for the mobile station 24, contains a digital audio interface (DAI) 41, which allows for transmitting test data received from the base station tester 10 via the RF signal to the cellular base station 12. The mobile station 40 performs the functions of the RF signal source 55 in terms of call set up and communication with the cellular base station 12. In this way the functions of the mobile station 40 can substitute for those of the RF signal source 55 (shown in FIG. 2). The alternative embodiment has the advantage of allowing different mobile stations 40 supporting different cellular protocols matching that of the particular cellular base station 12 to be readily substituted for one another without significant changes to the base station tester 10. Furthermore, the handling of complex cellular protocols may be easily handed within the mobile station 40, thereby simplifying the system requirements on the base station tester 10.

The RF signal from the mobile station 40 to the cellular base station 12 may be coupled over the air via the antennas 14 and 42 as shown, which provides for ease of set up of the test and with no need to take the celluar base station 12 out of service. However, the variations in the signal path may introduce errors in the tests. As an alternative, the mobile station 40, with suitable coupling and signal level matching, may be directly coupled via the coaxial cable 28 to the cellular base station 12 in a calibrated manner to achieve higher measurement accuracy levels.

The DAI 41, defined according to ETSI standard 607.1, has the further advantage of allowing the base station tester 10 to emulate the codec (coder-decoder) used in mobile stations. In this way, the operation of the corresponding codec within the cellular base station 12 may be tested with the formatted test data to obtain another parametric receiver measurement. Speech compression with the codec, defined according the particular cellular standard, is generally non-linear but deterministic. Thus, because the compression algorithm is specified and known and can be supplied with known test data, a known set of data may then be transmitted as speech frames that emulate the output of a codec which is then decoded within the cellular base station 12 to effectively test its codec.

It will be obvious to those having ordinary skill in the art that many changes may be made in the details of the above-described preferred embodiments of the invention without departing from the spirit of the invention in its broader aspects. For example, the parametric measurement unit 51 may be readily modified to be as simple or as complex as needed to handle different types of parametric measurements across differing cellular standards. Similarly, the protocol processor 52 may be as simple or as complex as needed to handle different signaling protocols across the different cellular standards and manufacturers. The base station tester 10 could be implemented as a portable test instrument that travels with the maintenance technician to different cell sites. Alternatively, the base station tester 10 could be built into the cell site to selectively monitor and detect trouble in the various cellular base stations 12 at a particular cell site as part of an automated monitoring system. Therefore, the scope of the present invention should be determined by the following claims.

What we claim as our invention is:

1. A cellular base station tester comprising:
   (a) a protocol processor for coupling to a fixed link signal between a cellular base station and a base station controller to receive and decode said fixed link signal to produce a decoded fixed link signal;
   (b) a parametric measurement unit for coupling to an RF signal from said cellular base station to produce a measurement result from said RF signal; and
   (c) a controller coupled to said protocol processor and to said parametric measurement unit to produce a test result using said decoded fixed link signal and said measurement result.

2. A cellular base station tester according to claim 1 wherein said decoded fixed link signal comprises a control channel.

3. A cellular base station tester according to claim 1 wherein said decoded fixed link signal comprises a voice channel.

4. A cellular base station tester according to claim 1 further comprising a signaling interface unit interposed between said fixed link signal and said protocol processor.

5. A cellular base station tester according to claim 1 wherein said parametric measurement unit comprises:

an RF receiver coupled to said RF signal and a demodulator coupled to said RF receiver to provide demodulated signal information;

a power measurement coupled to said RF signal to provide a power level; and a frequency measurement coupled to RF signal to provide a frequency;

wherein said demodulated signal information, said power level, and said frequency are selectively provided to said controller as said measurement result.

6. A cellular base station tester according to claim 1 further comprising an RF signal source for coupling an RF test signal to said cellular base station, said RF signal source coupled to said controller to receive test data and modulate said RF test signal with said test data, wherein said controller compares said test data with selected information from said decoded fixed link signal to perform a parametric receiver measurement.

7. A cellular base station tester according to claim 1 further comprising a mobile station, said mobile station comprising a DAI interface coupled to said controller to receive test data and modulate said RF test signal with said test data, wherein said controller compares said test data with selected information from said decoded fixed link signal to perform a parametric receiver measurement.

8. A cellular base station tester according to claim 1 wherein said base station tester performs tests according to a plurality of cellular standards.

9. A cellular base station tester according to claim 1 wherein said decoded fixed link signal comprises a voice channel and a control channel.

10. A method of testing a cellular base station comprising:

monitoring a fixed link signal between said cellular base station and a base station controller;

decoding said fixed link signal to obtain a decoded fixed link signal;

receiving selected information from said decoded fixed link signal;

performing a parametric measurement of an RF signal to obtain a measurement result responsive to said selected information; and producing a test result from said selected information and said measurement result.

11. A method of testing a cellular base station according to claim 10 further comprising receiving said RF signal from one of said cellular base station and a mobile station.

12. A method of testing a cellular base station according to claim 10 further comprising decoding said fixed link signal to obtain a voice channel.

13. A method of testing a cellular base station according to claim 10 further comprising decoding said fixed link signal to obtain a control channel.

14. A method of testing a cellular base station according to claim 13, said selected information comprising a command, said method further comprising receiving said command on said control channel.

15. A method of testing a cellular base station according to claim 10, further comprising:

generating an RF test signal modulated with test data;

receiving said RF test signal in said cellular base station; and comparing said selected information with said test data to perform a parametric receiver test.

* * * * *